US012775777B1

(12) United States Patent
Griffin et al.

(10) Patent No.: US 12,775,777 B1
(45) Date of Patent: Oct. 27, 2026

(54) MODIFIABLE COMMUNICATION GENERATION FROM A STATIC IMAGE

(71) Applicant: Intuit Inc., Mountain View, CA (US)

(72) Inventors: Ashton Phillips Griffin, Steamboat Springs, CO (US); Ashish Murlidhar Pagote, Atlanta, GA (US); Ian Maffett, Atlanta, GA (US); Bryan Smith, Acworth, GA (US); Joshua Fischer, New York, NY (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/370,255

(22) Filed: Oct. 27, 2025

(51) Int. Cl.

| | |
|---|---|
| ***G06F 40/143*** | (2020.01) |
| ***G06Q 30/0241*** | (2023.01) |
| ***G06V 30/414*** | (2022.01) |
| *G06N 5/04* | (2023.01) |

(52) U.S. Cl.
CPC .......... *G06F 40/143* (2020.01); *G06V 30/414* (2022.01); *G06N 5/042* (2013.01); *G06Q 30/0276* (2013.01)

(58) Field of Classification Search
None
See application file for complete search history.

(56) References Cited

U.S. PATENT DOCUMENTS

| | | | | |
|---|---|---|---|---|
| 12,499,172 | B1 * | 12/2025 | Grybauskas | G06F 16/958 |
| 2019/0250891 | A1 * | 8/2019 | Kumar | G06F 8/38 |
| 2023/0386236 | A1 * | 11/2023 | Rimchala | G06V 30/19167 |
| 2023/0419014 | A1 * | 12/2023 | O'Donovan | G06F 40/126 |
| 2024/0289361 | A1 * | 8/2024 | Batina | G06F 40/40 |
| 2025/0078549 | A1 * | 3/2025 | Achiwa | G06V 30/416 |
| 2025/0124622 | A1 * | 4/2025 | Bhakthavatsalam | G06F 40/40 |
| 2025/0131624 | A1 * | 4/2025 | Boyd | G06T 11/00 |
| 2025/0209085 | A1 * | 6/2025 | Rai | G06F 16/254 |
| 2025/0272128 | A1 * | 8/2025 | Tworek | G06F 9/45508 |
| 2025/0348788 | A1 * | 11/2025 | Rowe | G06N 20/00 |
| 2025/0390914 | A1 * | 12/2025 | Schler | G06Q 30/0257 |
| 2026/0003852 | A1 * | 1/2026 | Ceker | G06F 16/2365 |
| 2026/0023919 | A1 * | 1/2026 | Goel | G06F 40/143 |

* cited by examiner

*Primary Examiner* — Linda Huynh
(74) *Attorney, Agent, or Firm* — Dinsmore & Shohl LLP

(57) ABSTRACT

Certain aspects of the disclosure provide techniques for modifiable communication generation from a static image. A method generally includes prompting a first language model (LM) to: extract, from a static image comprising a plurality of visual elements and associated with a first layout, a plurality of attributes; and generate, based on the static image and the plurality of attributes, markup language code for the static image; obtaining, from the first LM, the markup language code; prompting a second LM to generate, based on at least the markup language code, and in compliance with a schema, a structured object that defines a modifiable communication; obtaining, from the second LM, the structured object; and generating, for display on a computing device, the modifiable communication based on the structured object, wherein the modifiable communication comprises a plurality of elements and is organized according to the first layout.

20 Claims, 13 Drawing Sheets

300

You are an expert in segmenting out images from a larger image of an email. Get the bounding boxes of ALL the IMAGE and LOGOS OBJECTS within the provided email image. Don't give overlapping bounding boxes. Try to combine overlapping bounding boxes combine into one.
Don't give bounding boxes of text objects or button objects. The bounding boxes can be rectangles, squares in shape.
Keep in mind that many images in emails are irregularly shaped objects over a transparent background.
Please ensure that the bounding box contains the entire object.

302

Please return the bounding box, the type of image (image, icon, or logo), and a short description of the image. Please return a valid JSON. For example:

{"box_2d": [10, 100, 50, 200],
 "label": "icon",
 "description": "a drawing of a hat"}

*FIG. 3*

400

402

I am giving you two set of images.
First image is present between tags <original> and </original>. It is a single image.

404

As a highly skilled frontend developer specializing in HTML and CSS, your task is to create a HTML code that when rendered looks exactly like this original image.

406

Analyze this image thoroughly:
Identify all the visual elements (text, subimages, buttons, dividers, backgrounds, etc.)
Note differences in color, size, and location.

Decompose the design:
Break down the image into structural components.
Assign each component to an appropriate HTML element.

Construct the HTML and CSS:
Begin with a standard HTML template.
Incrementally add HTML elements to shape the basic structure.
Apply CSS for accurate styling, closely matching the the image.

Key areas to focus on include:
Background Colors: Determine if multiple backgrounds are used and apply these color values appropriately in CSS.
Text Specifications: Match text color using exact hexadecimal values and retain font size and family to keep the visual hierarchy and aesthetics intact.
Element Positioning: Carefully place all elements to match their relative positions in the original design. This includes aligning text, images, and other components accurately.
Spacing: Incorporate exact padding and margins to maintain spatial relationships between elements.
Borders and Dividers: Replicate borders and dividers with precise thickness, color, and placement.
Button Details: The buttons should mimic the original shapes, sizes, and colors.
Layout Integrity: Ensure the overall layout (rows, columns, stacking) mirrors that of the image.

408

Subimage Insertion:
In the HTML code, place the subimages using the path given for them in the correct POSITION, ALIGNMENT,SIZE and ORIENTATION.
Second set of images is a list of subimages present between tags <subimage> and </subimage>.
The subimages in the list are in the order they appear in the original image.
I am also giving the list of the path of these subimages between tags <path> and </path> in the same order.
WHEN THE HTML IS RENDERED IT SHOULD LOOK AS CLOSE TO AS THE ORIGINAL IMAGE.

Final Checklist:
Ensure an exact color match for all elements. The ten most prevalent hex codes in the image are: {colors}.
Use precise text content from the image.
Generate comprehensive code without placeholder comments; replicate every element as seen.
Double-check the layout and styling to ensure the output resembles the original image perfectly.

This task requires meticulous attention to detail and a deep understanding of HTML and CSS to ensure the rendered output is an exact visual match to the provided image. By implementing these guidelines, the resulting code will accurately reflect the design intent.

Please ensure that the final code is enclosed within <html></html> tags, free from extraneous markdown or comment placeholders.

*FIG. 4*

500

You are a coding expert specializing in converting HTML to Nuni JSON. Nuni JSON is a proprietary representation of an email before it has been rendered. You will be given HTML representing an email between the tags <html> and </html>.

502

Your task is to use your understanding of Nuni JSON to convert the email HTML into Nuni JSON. It is essential that the output is properly formatted Nuni JSON or else the email will fail to render.

Below I will give you an overview of what Nuni JSON is, including the blocks it is made up of, the properties that belong in each block, how layout and style is incorporated, and what the overall structure must be to render correctly. I will also give an example of a full Nuni JSON object representing a renderable email to use as reference and guidance. You will use this information to reason through how to convert the given email HTML to a valid Nuni JSON object that is renderable.

*FIG. 5A*

500

504

Below is a guide to better understanding Nuni JSON given between the tags <nuni_guide> and </nuni_guide>.

<nuni_guide>

Overview of Nuni JSON

Nuni is made up of blocks which form the base of the full Nuni JSON object. Blocks are defined at all levels of the hierarchy, both as root objects and as children objects of other sections. Each block is a valid JSON object in and of itself. They help define layout, content, and style. Each block type has a set of properties which help define these elements.

Note that style (e.g., color, font, font size, etc.) is defined in one of two ways. First, at the global level in the root block. This applies throughout the email to all other blocks. The second way is at the section level in which style is applied at the section or block level via that block's properties. Section level styling will override global styling, but only for the specified section or block.

Currently supported fonts are Arial, Comic Sans, Courier New, Georgia, Helvetica, Lucid , Tahoma, Times New Roman, Trebuchet MS, Verdana, Noticia Text, Noto Sans, Open Sans, Playfair Display, Raleway, Recursive, Roboto, Source Sans 3, Source Code Pro, Space Mono,SYNCOPATE, Work Sans, Abril Fatface, Alegreya, Alegreya Sans, Anton, Arimo, Arvo, Catamaran, Della Respira, DM Sans, Gilda Display,Lato, Lora, Marcellus, Merriweather, Merriweather Sans, Nanum Gothic Coding,Neuton. While converting from HTML to Nuni, find the closest font match.

In Nuni JSON, when property values are boolean it is essential that they are all lowercase (e.g., true or false). Below I will outline some of these block types for use in composing a full Nuni JSON object. Pay attention to the requirements outlined as well as the properties associated to each.

[... EXAMPLE ELEMENTS PROVIDED SUCH AS AN IMAGE BLOCK ELEMENT SHOWN IN FIG. 5C...]

It is essential that all of these elements are formatted properly, and when combined in different ways, form a valid JSON object. Otherwise, the Nuni JSON object cannot be rendered. Don't make up properties or key-value pairs that you haven't seen or been instructed on. For example there is no marks type "color" in Nuni JSON, and as such it should not be included in your output.

</nuni_guide>

*FIG. 5B*

500

Image Block
Image blocks allow our users to insert images and gifs into their document. An image block only supports one image at a time. When it is a logo, it will have the properties - "emailType": "LOGO" and "isLogo": true. Inline cropping and resizing of images is allowed. See below for a list of properties associated to the image block:

- actualWidth (number)
- alignSelf (string: left, center, right)
- alt (string)
- borderRadius (number)
- computedPercentageWidth (number)
- computedWidth (number)
- maxHeight (number)
- minHeight (number)
- src (string)
- width (number)

See an example of an image block below between the tags <image_block_example> and </image_block_example>.

<image_block_example>

```
{
  "type": "IMAGE",
  "properties": {
    "emailType": "LOGO",
    "isLogo": true,
    "src": "https://cdn-images.mailchimp.com/template_images/email/02e89d02fa76f31fd037d1a51/images/
920e8774-f445-db8d-d364-eecc3c97f75f.png",
    "width": 95,
    "height": 150,
    "actualWidth": 1000,
    "actualHeight": 1000,
    "alignSelf": "left",
    "blockPadding": {
      "top": 18,
      "bottom": 18,
      "right": 34,
      "left": 30
    },
    "rect": null,
    "isFullBleed": true,
    "altRec": {
      "url": "https://cdn-images.mailchimp.com/template_images/email/02e89d02fa76f31fd037d1a51/images/
920e8774-f445-db8d-d364-eecc3c97f75f.png"
    }
  }
}
```

</image_block_example>

*FIG. 5C*

700

```
{
  "type": "ROOT",
  "properties": {
    "richTextKey": "email",
    "globals": {
      "baseSpacing": 24,
      "backgroundColor": "#eeeeee",
      "contentBackgroundColor": "#ffffff",
      "paragraphFontFamily": "helvetica",
      "paragraphTextColor": "#4d4d4d",
      "paragraphFontSize": 16,
      "paragraphLineHeight": 1.6,
      "heading1FontFamily": "helvetica",
      "heading1TextColor": "#1e1e1e",
      "heading1FontSize": 28,
      "heading1Bold": true,
      "linkTextColor": "#2e88c7",
      "linkUnderline": false,
      "buttonBackgroundColor": "#2ea6ef",
      "buttonColor": "#ffffff",
      "buttonFontFamily": "helvetica",
      "buttonFontSize": 16,
      "buttonBorderRadius": 5,
      "buttonVerticalPadding": 12,
      "buttonHorizontalPadding": 24,
      "maxWidth": 600,
      "dividerColor": "#dddddd"
    }
  },
  "children": [
    {
      "type": "WRAPPER",
      "properties": {
        "innerBackgroundColor": "#ffffff",
        "outerPaddingTop": 20,
```

FIG. 7A

700

```
      "outerPaddingBottom": 20
    },
    "children": [
      {
        "type": "ROW",
        "properties": {
          "backgroundColor": "#2e88c7",
          "padding": {
            "top": 0,
            "bottom": 0,
            "horizontal": 0
          }
        },
        "children": [
          {
            "type": "COLUMN",
            "properties": {
            "span": 12
            },
            "children": [
              {
                "type": "IMAGE",
                "properties": {
                  "src": "https://storage.cloud.google.com/ashish_image_nuni/
                         extracted_images/is-this-yours-tom-danny/image_1.png",
                  "alt": "Technology Business Logo",
                  "width": 150,
                  "alignSelf": "center",
                  "blockPadding": {
                    "top": 20,
                    "bottom": 20,
                    "left": 20,
                    "right": 20
...
```

702

FIG. 7B

MODIFIABLE COMMUNICATION GENERATION FROM A STATIC IMAGE

BACKGROUND

Field

Aspects of the present disclosure relate to digital communication.

Description of Related Art

Electronic mail (or email) is a form of written digital communication that involves the transmission of messages from a user to one or more recipients via a network, such as the Internet. Email facilitates the efficient exchange of information, enables real-time feedback, and provides worldwide connectivity, thereby making it a widely used tool for a broad range of communication purposes across various contexts. For example, email has become a primary method of communication for many individuals, businesses, educational institutions, non-profit organizations, government agencies, and the like.

To streamline and standardize recurring digital communications (simply referred to herein as "communications"), such as email, communication templates (e.g., email templates) are often utilized. A "communication template," also simply referred to herein as a "template," refers to a predefined layout and content structure that may be reused for information dissemination, such as for announcements, newsletters, transactional notifications, and/or marketing campaigns, among others. While communication templates may help to maintain consistency and save time in communication generation, such templates are generally limited to the layouts and content options provided within the templates themselves. For example, an email template designed to have a minimalist layout and allow for only the promotion of a single product (e.g., allows for the upload of one product image and the editing of one product description) may limit a user to select and feature one product per email. Sending an individual email for every product may result in email fatigue for the user's customers, and thereby adversely affect the user's reputation in the industry, among other consequences.

Further, due to their inflexible design, users may face technical challenges when trying to modify templates beyond their preset structures, incorporate distinct design elements, and/or achieve a desired level of customization for their specific communication needs.

SUMMARY

Certain aspects provide a method of modifiable communication generation. The method includes prompting a first language model (LM) to: extract, from a static image comprising a plurality of visual elements and associated with a first layout, a plurality of attributes; and generate, based on the static image and the plurality of attributes, markup language code for the static image; obtaining, from the first LM, the markup language code; prompting a second LM to generate, based on at least the markup language code, and in compliance with a schema, a structured object that defines a modifiable communication; obtaining, from the second LM, the structured object; and generating, for display on a computing device, the modifiable communication based on the structured object, wherein the modifiable communication comprises a plurality of elements and is organized according to the first layout.

Certain aspects provide another method of modifiable communication generation. The method includes prompting an LM to generate, based on markup language code for a static image, and in compliance with a schema, a structured object that defines a modifiable communication, wherein the static image comprises a plurality of visual elements and is associated with a first layout; obtaining, from the LM, the structured object; and generating, for display on a computing device, the modifiable communication based on the structured object, wherein the modifiable communication comprises a plurality of elements and is organized according to the first layout.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts an example prompt for image extraction.

FIG. 4 depicts an example prompt for converting a communication captured in a static image to markup language code.

FIGS. 5A-5C depict an example prompt for converting markup language code to a structured object.

FIGS. 7A and 7B depicts an example JavaScript Object Notation (JSON) object created for the static image in FIG. 6.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
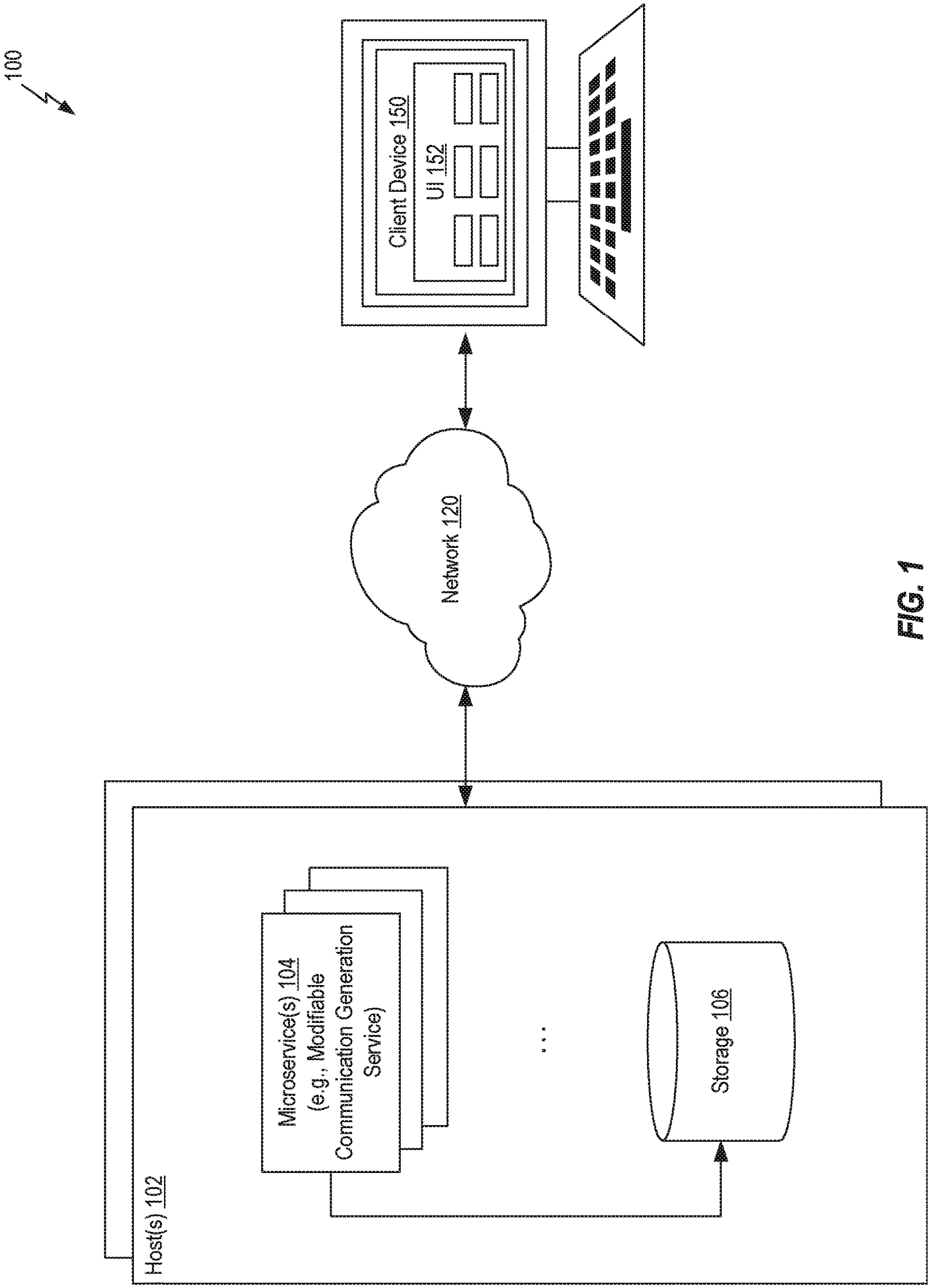
FIG. 1 is a schematic system diagram illustrating an example processing system supporting microservices interconnected via a network.

To overcome the aforementioned technical limitations of standard, pre-built templates, users may opt to design and build new communication templates that are tailored to their specific needs and/or preferences. For example, in some cases, a user may draw inspiration from a static image of an example communication when creating their own custom design. However, because the static image (e.g., a fixed, non-editable and non-interactive visual representation of the communication) cannot be directly converted into an editable template, users are often faced with two suboptimal options.

In a first option, a user may manually recreate each visual element of the communication within a communication editing platform. In certain aspects, this includes the user assembling text block(s), image(s), button(s), color(s), and/or layout container(s) one by one (e.g., via the communication editing platform), attempting to match the original layout and style of the original communication. This process may be time-consuming, error-prone, and resource intensive, often demanding substantial manual effort to reconstruct the communication and adapt it for subsequent use. Further, in some cases, a loss of fidelity with respect to the original communication's layout, spacing, style, and/or visual elements may result.

In a second option, a user may simply insert a static image of the communication as a single, non-editable element within another communication. For example, in some cases, a communication editing platform may not enable direct editing of a communication designed in third-party software, nor offer a seamless transition from a static image of the communication to an editable document (e.g., that shares a similar template and design as the original communication). Thus, a user may be restricted to inserting, in another communication (e.g., an email), a static image of the communication designed and developed using third-party software. Using a static image of the communication may prevent any further customization and/or editing of individual visual elements (e.g., its header, banner, infographics, text, buttons, dividers, backgrounds, etc.) included in the original communication, thereby limiting the flexibility and usefulness of the resulting communication (e.g., the email).

Aspects described herein overcome the aforementioned technical problems and improve upon the state of the art by introducing techniques for efficiently converting static images of communications (e.g., communication designs) into modifiable communications. The techniques involve utilizing a combination of language models (LMs) and extraction service(s) to analyze and represent the design features (e.g., visual elements and layout) of a static image of a communication as a modifiable output, referred to herein as a "modifiable communication." For example, in certain aspects, the LMs and extraction service(s) may be leveraged to perform a coordinated sequence of specialized processing steps such as to orchestrate (1) the extraction of relevant information from a static image, (2) the generation of an intermediate representation, such as markup language code, for the static image, and (3) the conversion of the intermediate representation into a structured object. The structured object may have a format that is compatible with one or more communication editing platforms such that when rendered, a modifiable communication is generated including element(s) that correspond to visual element(s) included in the static image and are modifiable via the one or more communication editing platforms.

As used herein, for simplicity, reference to a "static image" may refer to the static image and/or a communication captured by the static image. For example, the extraction of relevant information from a static image may refer to the extraction of relevant information for the communication captured by the static image. As another example, visual element(s) included in a static image may refer to visual element(s) included in the communication captured by the static image.

As used herein, "markup language code" refers to code that uses tags to define markup language elements within a document (e.g., a communication), which may control the document's presentation, structure, and/or behavior. In a markup language, "tags" may represent the structural components of a document, such as <h1> for headings, <p> for paragraphs, <b> for bold text, etc. Markup language elements may include sets of tags (e.g., opening and closing tags indicating the content to which the tag is operative) along with any content between the tags (e.g., the markup language element "<p> My first paragraph <p>" includes an opening tag <p>, a closing tag <p>, and content "My first paragraph"). Common example markup languages include Hypertext Markup Language (HTML), eXtensible Markup Language (XML), and Markdown.

As used herein, a "structured object" refers to a structured data format that specifies the organization and properties of individual elements, such as one or more editable elements, within a communication. In certain aspects, the structured object specifies the elements in a hierarchical tree structure (e.g., this is different than markup language code where the elements are specified with tags). In certain aspects, a structured object may be generated based on a schema. A "schema" may refer to a structured framework that specifies the content and structure of a particular, structured object, such as the blocks it is made up of, the properties that belong in each block, expected data types and/or formats for each property/block, default values, constraints (e.g., limits on values), rules, how layout and style is incorporated, and what the overall structure needs to be, such as to render the structured object correctly. By encompassing these components, in certain aspects, a schema may be used to guide an LM in the generation of a structured object. One example schema includes a JavaScript Object Notation (JSON)-based format for a structured object. One example structured object generated from a JSON schema includes a JSON object.

In certain aspects, the techniques described herein enable the transformation of a static image of a communication template into a JSON object (e.g., an example structured object) that defines a modifiable version of the communication template. This process begins with using a first LM and one or more extraction services to extract visual and/or structural information, referred to herein as "attributes," from the static image and generate HTML code (e.g., example markup language code) that represents the original layout and design of the communication template. For example, the HTML code may serve as an intermediate format that captures visual elements, such as text, graphic(s), color(s), and layout container(s), and their arrangement (e.g., positioning, alignment, and/or organization) in the communication template. The HTML code is then further processed and converted, with a second LM, into a JSON object, which specifies the organization and properties of individual elements (e.g., such as editable elements) within the communication template. In certain aspects, the resulting JSON object is compatible with a communication editing platform. Accordingly, when the resulting JSON is rendered to generate the communication template, a user is able to modify (or adjust), via the communication editing platform, discrete element(s) of the communication template defined by the JSON object. Through this multi-stage process, the static image may be transformed into a modifiable communication template that supports granular customization and efficient communication creation. In certain aspects, the modified communication template is generated and edited for distribution to one or more recipients (e.g., such as via email).

The techniques described herein provide notable technical advantages over conventional solutions, such as enhanced efficiency in generating modifiable communications and the capability to transform static images of communication designs into modifiable formats. By enabling users to efficiently transition from visual inspiration to customizable communications, the techniques presented herein address technical challenges associated with conventional approaches, such as tedious manual reconstruction, limited customization, and loss of design fidelity, as described in detail above. For example, the techniques described herein remove the need for users to manually recreate each visual element of a communication design and instead facilitate automated extraction and conversion processes that maintain the structure and style of the original design. This functionality may enable users to rapidly iterate on communication designs, migrate existing communication templates from non-native tools, and/or adapt external inspirations into communications without substantial manual work.

Notably, the improved techniques described herein can further enhance the function of any application that supports digital communication editing and/or communication template management. For example, any application that allows a user to create, modify, and/or deploy communications can benefit from the automated conversion and editing capabilities provided by the techniques described herein. In some cases, a user may upload a static image of a communication and immediately receive an editable template, which may be customized to meet specific needs and/or preferences of the user. In this way, the technical effects of the described techniques enable users to avoid the inefficiencies (e.g., in some cases, users may save approximately two hours of their time) and limitations of conventional solutions, supporting more flexible, scalable, and user-friendly workflows in digital communication environments.

Example System Implementing a Modifiable Communication Generation Service

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

Figure 2:
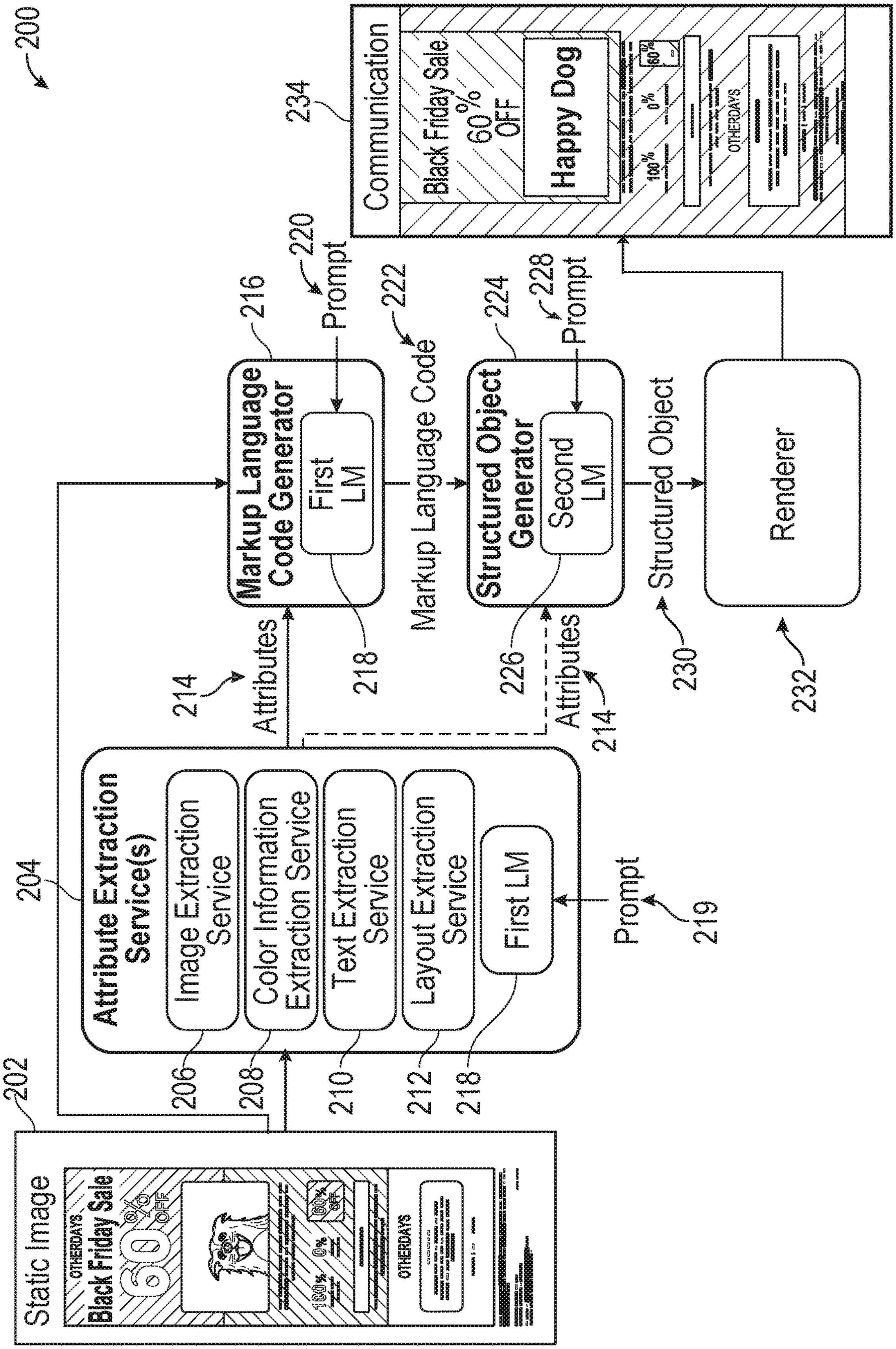
FIG. 2 depicts an example system configured for modifiable communication generation from a static image.

As shown in FIG. 1, in certain aspects, microservice 104 implements modifiable communication generation service, which is any network 120 accessible service that converts static images of communication designs into modifiable communications, as described, for example, with respect to FIG. 2. In certain aspects, the modifiable communication generation service or another microservice 104 may implement LM(s) and extraction service(s) to analyze and represent the design features (e.g., visual elements and layout) of a static image of a communication as a modifiable output (e.g., such as modifiable via a communication editing platform). A microservice 104, or a host 102 that implements a microservice 104, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example System for Modifiable Communication Generation from a Static Image

FIG. 2 depicts an example system 200 configured to generate modifiable communications from static images. More specifically, system 200 is designed to leverage one or more attribute extraction services 204, a markup language code generator 216, a structured object generator 224, and a renderer 232 of system 200 to automate the transformation of a static image 202, which represents a non-editable communication, into a communication 234 (also referred to herein as a "modifiable communication 234") with one or more elements that are capable of being modified via a communication editing platform.

In certain aspects, system 200 may be used to generate communication 234 from static image 202 based on generating an intermediate representation, such as markup language code 222, for the static image 202, and further converting the markup language code 222 into a format, such as a structured object 230, that is compatible with the communication editing platform. The structured object 230 may be rendered to generate communication 234 such that communication 234 has (1) one or more elements that mirror visual element(s) of the static image 202 and/or (2) one or more elements that are modified to be different than visual element(s) of the original communication.

As used herein, for simplicity, reference to the "static image 202" may refer to the static image 202 and the communication it represents. For example, system 200 generating communication 234 for the static image 202 may refer to system 200 generating communication 234 for the communication represented in static image 202. As another example, visual elements associated with static image 202 may refer to visual elements included in the communication represented by static image 202. Further, as another example, attributes associated with static image 202 may refer to attributes 214 extracted for the communication represented by static image 202.

The process performed by system 200 to generate a (modifiable) communication 234 may begin by system 200 obtaining the static image 202. In certain aspects, the static image 202 is provided to system 200 by a user. For example, a user may upload the static image 202 for use by system 200, scan the static image 202 for use by system 200, or capture the static image 202 directly within an application used to execute system 200.

The static image 202 may serve as a visual reference for a communication (e.g., a communication design or template). For example, the static image may represent an example layout and content structure for one or more visual elements associated with a communication, such as an announcement, a newsletter, a transactional notification, a marketing campaign, and/or the like. As used herein, "visual elements" associated with a communication refer to design components that visually communicate a message to a recipient of the communication. Example visual elements associated with a communication may include headers, logos, banners, infographics, images, text, buttons, dividers, backgrounds, etc. The static image 202 may be non-editable, meaning the communication's visual element(s) and layout, captured in the static image 202, may not be changed or altered. Further, the static image 202 may be non-interactive, meaning the communication's visual element(s) and layout may not change in response to user input (e.g., mouse clicks, text input, etc.).

An example static image 202 of a communication may include a screenshot of a communication. Another example static image 202 of a communication may include a communication originating from and created with a third-party design tool. In this example, the communication, although compatible with the third-party design tool, may not be compatible with one or more other communication editing platforms.

In an illustrative example, the static image 202 may comprise an image of the example email marketing campaign shown in FIG. 2. As used herein, an "email marking campaign," refers to a promotional or informational message sent as an email to one or more recipients to promote product(s), service(s), and/or content. An email marketing campaign may include visual element(s), such as images, text, buttons, banners, etc., to achieve its intended purpose. The static image 202 of the example email marketing campaign shown in FIG. 2 depicts an image of a marketing campaign that is used to inform recipient(s) of the campaign about a 60% Black Friday Sale happening for Otherdays (e.g., a corporation that sells dog food). Example visual elements included in the email marketing campaign include an image of a dog, a bolded title with text reading "Black Friday Sale," three background colors (e.g., white and two different shades of yellow shown with different hatch marks in FIG. 2), and a black bar, among many other elements.

Attribute extraction service(s) 204 of system 200 may analyze the static image 202 obtained by system 200 and use one or more extraction techniques to extract one or more attributes 214 for the static image 202.

For example, in certain aspects, attribute extraction service(s) 204 includes an image extraction service 206 that is configured to (1) identify one or more visual elements associated with the communication and depicted in static image 202 and (2) extract information about the identified visual element(s). In certain aspects, the extracted information includes one or more bounding boxes for a first set (e.g., one or more) of the identified visual element(s). A "bounding box" is an outline (e.g., a generally rectangular outline) generated around an item of interest (e.g., a visual element) included in the static image 202 of the communication. In certain aspects, the extracted information includes one or more labels for a second set of the identified visual element(s). "Labels" may include descriptive tags that provide context for identified visual element(s), and may include tags such as "header," "company logo," "image," etc. In certain aspects, the extracted information includes one or more descriptions associated with a third set of the identified visual element(s). A description extracted for a visual element may provide information about the visual element beyond a label associated with the visual element. For example, a description may provide additional and/or more comprehensive information about a visual element than a label associated with the visual element. In certain aspects, the extracted information includes one or more paths associated with a fourth set of the identified visual element(s) (e.g., a "path" may indicate where a particular visual element is stored, such as a uniform resource locator (URL), a link, or a file or image path on a server or content delivery network (CDN)). In certain aspects, the first set, the second set, the third set, and/or the fourth set of the identified visual element(s) include the same identified visual element(s). In certain aspects, each of the first set, the second set, the third set, and the fourth set of the identified visual element(s) include different visual element(s).

In certain aspects, attribute extraction service(s) 204 includes a color information extraction service 208 that is configured to analyze static image 202 to identify and extract color-related attributes 214. In certain aspects, the color-related attributes 214 include one or more hexadecimal (hex) color codes associated with static image 202. For example, the color information extraction service 208 may analyze static image 202 to determine the most prominent colors present in the communication captured by static image 202, such as by calculating the top ten hex codes based on pixel distribution. The hex codes may correspond to background colors, button colors, accent visual elements, and/or the like found in the static image 202 of the communication. A "hex code" may be used to provide a precise digital representation of a color used in the communication design captured by static image 202.

In certain aspects, attribute extraction service(s) 204 includes a text extraction service 210 that is configured to extract text and/or related typographical features (e.g., other example attributes) from static image 202. Typographical features of textual elements may include font type, font size, and/or style, such as whether the text is bold, italicized, and/or underlined. In certain aspects, the text extraction service 210 employs optical character recognition (OCR) and/or font analysis techniques to perform such extraction.

In certain aspects, attribute extraction service(s) 204 includes a layout extraction service 212 that is configured to determine the spatial arrangement and/or organization of visual element(s) included in static image 202, and use this information to determine layout-related attributes of static image 202. Example layout-related attributes may include positioning information for a first set of visual elements in static image 202, alignment information for a second set of visual elements in static image 202, and/or organization information associated with a third set of visual elements associated with static image 202. In certain aspects, the first set, the second set, and/or the third set of the identified visual element(s) include the same identified visual element(s). In certain aspects, each of the first set, the second set, the third set, and the fourth set of the identified visual element(s) include different visual element(s).

As used herein, "positioning information" refers to data that specifies the location of a visual element within static image 202. Example positioning information for a visual element may include its coordinates (e.g., such as x and/or y values), dimensions (e.g., such as width and/or height), and/or relative placement with respect to the boundaries of static image 202 and/or to one or more other visual elements. For example, positioning information may indicate that a logo in the communication, captured by static image 202, is located twenty pixels from the top edge of static image 202 and fifty pixels from the left edge of static image 202.

Further, as used herein, "alignment information" refers to data that describes how visual elements are arranged in relation to each other or static image 202. Example alignment information for a visual element may include an indication as to whether the visual element is left-aligned, right-aligned, centered, or justified horizontally or vertically in the static image 202 or with respect to one or more other visual elements. For example, alignment information for a row of buttons depicted in static image 202 may include information about how the buttons are centered beneath a header (e.g., another example visual element) in static image 202.

Further, as used herein, "organization information" refers to data that defines the structural grouping and/or hierarchical relationships among visual elements in static image 202. Example organization information may include information about which visual elements of the communication are grouped together in containers, the order in which visual elements appear (e.g., such as by stacking or layering), and/or the logical structure of sections, columns, and/or rows in static image 202.

In certain aspects, attribute extraction service(s) 204 leverages a first LM 218 to perform analysis and extraction on the static image 202 and thereby obtain attributes 214 for the static image 202 of the communication. As used herein, a "language model (LM)" is a type of machine learning (ML) model that supports natural language processing (NLP) tasks, such as generating text, analyzing sentiments, answering user queries in a conversational manner, translating text from one language to another, and/or the like. In certain aspects, LMs make it possible for software to "understand" typical human speech or written content and respond to it by, in some cases, generating human-understandable responses through natural language generation (NLG). A large language model (LLM) is a type of LM that has a large number of parameters, such a language model with greater than 100 billion parameters (although, it is noted, that the number of parameters generally associated with a simple language model and an LLM may change over time).

In certain aspects, first LM 218 comprises an LLM. In certain aspects, first LM 218 comprises a multimodal LLM (MLLM), which is an ML model that is capable of processing and understanding multiple types of data modalities, such as visual and textual data. Use of an MLLM as first LM 218 may enable first LM 218 to understand the relationships between different visual elements present in static image 202, such as how text is positioned relative to subimages in static image 202 and/or how color depicted in static image 202 is used to highlight specific visual elements. Advantageously, this integrated understanding may help to achieve accurate reconstruction of the structure and/or content associated with static image 202 as markup language code 222, and further structured object 230 and communication 234.

In certain aspects, first LM 218 is prompted, based on a prompt 219, to perform the analysis and extraction of attributes 214 from static image 202. As used herein, a "prompt" (e.g., such as prompt 219) refers to a specific instruction and/or request, posed in natural language, provided to an LM (e.g., such as first LM 218) (or a computer program) to perform a particular task and/or generate a specific output. For example, in some cases, prompts include one or more user requests (e.g., questions, queries, and/or commands) and are provided as input to an LM to instruct the LM to resolve and/or respond to the one or more user requests. A prompt may consist of terms and/or phrases spoken normally and/or entered as they might be spoken, without any special format and/or alteration of syntax. In some cases, prompts are generated through a text and/or voice interface.

In certain aspects, prompt 219 includes (1) an indication of the static image 202 (e.g., depicting the communication that is to be transformed by system 200) and (2) first instructions to extract attributes 214 for static image 202.

An example of prompt 219, which may be used to prompt a first LM 218 implemented by attribute extraction service(s) 204, and more specifically image extraction service 206, is provided in FIG. 3. As shown in FIG. 3, the example prompt 300 includes instructions for identifying and extracting information about one or more visual elements in a static image of an email. Further, example prompt 300 includes instructions to extract attributes, such as bounding boxes, labels, and descriptions, for one or more visual elements in the email based on the language associated with reference numeral 302 and included in example prompt 300 (e.g., "Please return the bounding box, the type of image (image, icon, or logo), and a short description of the image" where the "image" refers to smaller images included in the email image).

Returning to FIG. 2, for the example shown, some example attributes 214 extracted by attribute extraction service(s) 204 may include a bounding box surrounding the image of the dog (e.g., a visual element) in static image 202, an "image" label for the image of the dog, and a description for the image of the dog indicating "Happy Dog," Other example attributes 214 extracted by attribute extraction service(s) 204 may include hex color codes associated with shades of yellow due to at least the background of the communication captured in static image 202. Other example attributes 214 extracted by attribute extraction service(s) 204 may include an indication that the image of the dog is centered in the communication. It is noted that the example attributes 214 listed herein are not an exhaustive list, and attribute extraction service(s) 204 may extract additional attribute(s) 214 from the example static image 202.

Markup language code generator 216 of system 200 may use the extracted attributes 214 and the static image 202 to generate markup language code 222 for the static image 202 and its represented communication. For example, markup language code generator 216 may generate markup language code 222 that accurately reflects the layout, style, and/or content identified in static image 202. In certain aspects, the markup language code 222 generated by markup language code generator 216 includes HTML code, XML code, and/or Markdown for static image 202.

In certain aspects, markup language code generator 216 utilizes first LM 218 (similar to attribute extraction service(s) 204) to generate markup language code 222 based on attributes 214 and static image 202. For example, first LM 218 may be prompted, based on a prompt 220, to process attributes 214 and static image 202 to generate markup language code 222 for static image 202. In certain aspects, prompt 220 includes (1) an indication of the static image 202 (e.g., depicting the communication that is to be transformed by system 200), (2) instructions to generate markup language code 222 (e.g., such as HTML code) for the static image 202 based on the attributes 214 and the static image 202, and/or (3) guidelines for generating the markup language code 222. Guidelines for generating markup language code 222 may be provided in prompt 219 to help guide first LM 218 in generating markup language code 222 such that markup language code 222 is both representative of the original static image 202 and suitable for further processing into a modifiable communication (e.g., into communication 234 by structured object generator 224 and renderer 232 of system 200). Example guidelines that may be incorporated in prompt 220 include instructions to (1) accurately represent the layout and structure of static image 202, including the relative positioning and/or grouping of its visual elements, (2) place all extracted text in the correct markup elements and match font styles, sizes, and colors as closely as possible to those identified in static image 202, (3) apply inline styles or class names to represent color codes, background colors, and other style attributes extracted from the image, (4) reference all images or icons using the extracted paths, (5) maintain responsive design principles where possible, such as using relative units for sizing and spacing, and (6) ensure that the generated markup language code 222 is well-formed, valid, and free of unnecessary or redundant markup language elements, among others.

An example of prompt 220, which may be used to prompt first LM 218 implemented by markup language code generator 216 is provided in FIG. 4. As shown in FIG. 4, the example prompt 400 includes instructions for generating HTML code, such that when the HTML code is rendered the output resembles an image (e.g., a "first image") identified by the example prompt 400. In this example, example prompt 400 includes an indication of a static image depicting a communication for which markup language code is to be generated, as shown at 402 ("First image is present between tags <original> and </original>. It is a single image.") Example prompt 400 further includes instructions to generate HTML code for the static image 202 based on attributes associated with the static image, as shown at 404 ("create a HTML code that when rendered looks exactly like this original image") and 406 ("Analyze this image thoroughly: Identify all the visual elements (text, subimages, buttons, dividers, backgrounds, etc.) Note differences in color, size, and location. Decompose the design: Break down the image into structural components. Assign each component to an appropriate HTML element."). Additionally, example prompt 400 includes guidelines for generating the HTML code. One example guideline included in prompt 400 is shown at 408 and indicates to add identified visual elements, such as subimage of the static image, to the HTML code using their associated path, position, alignment, size, and orientation extracted from the static image ("Subimage Insertion: In the HTML code, place the subimages using the path given for them in the correct POSITION, ALIGNMENT, SIZE and ORIENTATION.").

In certain aspects, validation and refinement techniques are performed by system 200 to help ensure the accuracy of the markup language code 222 generated by markup language code generator 216 (although not shown in FIG. 2). These techniques may include steps for rendering the generated markup language code 222 as a synthetic image and comparing the rendered synthetic image to the original static image 202, such as using quantitative similarity metrics. For example, in certain aspects, system 200 generates a first embedding for static image 202 and a second embedding for the rendered synthetic image (e.g., rendered based on markup language code 222). In certain aspects, an embedding model (e.g., such as a contrastive language-image pre-training (CLIP) model, like JINA CLIP 2 made available by Jina AI of Berlin, Germany) is used to generate the first and second embeddings. As used herein, an "embedding" created for an image may refer to a numerical vector representation that captures the visual characteristics of the image. A similarity score may then be calculated to measure how closely the two images match, such as in terms of overall appearance and/or content. In certain aspects, the similarity score is calculated based on a cosine similarity between the embeddings generated for the two images. Specifically, the cosine similarity may quantify the cosine of the angle between the two embeddings (e.g., vectors) generated for the static image 202 and the rendered synthetic image. In certain aspects, a higher cosine similarity value determined for two embeddings may indicate greater similarity between the two images. Similarly, a lower cosine similarity value determined for two embeddings may indicate less similarity between the two images. In certain aspects, a pixel-level comparison may be used to detect exact and/or near-exact matches between the static image 202 and the rendered synthetic image and generate the similarity score between the two images. In cases where the similarity score does not satisfy a threshold similarity (e.g., falls below a threshold similarity), system 200 may iteratively refine the markup language code 222. Example refinement may include adjusting the markup language code 222 until the markup language code 222, when generated, produces a synthetic image that more closely matches the original static image 202 (e.g., a similarity score calculated for the synthetic image and the static image 202 satisfies the threshold similarity). In certain aspects, such validation and refinement techniques may be performed prior to the generation of structured object 230 based on, at least, markup language code 222.

In certain aspects, another LM may be used to determine one or more differences between the static image 202 and the rendered synthetic image (e.g., the markup language 222-rendered image, or HTML-rendered image). In certain aspects, the difference(s) may be quantitatively defined by the LM, such as an indication of a number of pixels that are different between the images. In certain aspects, the difference(s) may be qualitatively defined by the LM, such as an indication of color and/or composition differences between the images. In certain aspects, example refinement may include adjusting the markup language code 222 based on the difference(s) determined by the LM.

Although prompt 219 and prompt 220 are shown as separate prompts in FIG. 2, in certain other aspects, a single prompt may be used to prompt first LM 218 to perform both (1) attribute extraction and (2) markup language code generation. For example, a prompt may combine information included in prompt 219 and prompt 220 such that first LM 218 is triggered to perform both of these tasks for static image 202.

Although FIG. 2 depicts the use of a single LM, e.g., LM 218, to perform both (1) attribute extraction and (2) markup language code generation, in certain other aspects, multiple LMs may be used to perform such tasks. For example, one LM may be trained for attribute extraction only and another LM may be trained for markup language code generation, and both LMs may be used accordingly in system 200. In this example, system 200 may include three LMs, such as a first LM for attribute extraction, a second LM for markup language code generation, and a third LM for structured object generation.

Structured object generator 224 may use the markup language code 222, generated by markup language code generator 216, to generate a structured object 230 that defines a modifiable communication, such as communication 234. In certain aspects, structured object generator 224 may also process attributes 214 to generate the structured object 230. As described herein, structured object 230 may comprise a structured data format that specifies the organization and properties of individual elements within communication 234. In certain aspects, structured object 230 may be generated based on a schema. Generating structured object 230 based on a schema may help to generate a data representation that is compatible with the requirements of a target (or multiple target) communication editing platform, while maintaining consistency between a communication defined by structured object 230 and the communication captured in static image 202.

One example schema includes a JSON-based format for structured object 230. Thus, structured object 230, generated by structured object generator 224 based on the example schema, may comprise a JSON object.

In certain aspects, structured object generator 224 leverages a second LM 226 to generate structured object 230 based on markup language code 222 and/or attributes 214, and in compliance with a schema. For example, second LM 226 may be directed to produce a structured object 230 that conforms to a specified schema, thereby enabling compatibility with a communication editing platform and supporting granular modification of individual element(s) included in a communication 234 defined by the structured object 230. The schema may specify the content and structure of the structured object 230, including blocks, properties, data types, formats, default values, constraints, and/or rules for the layout and style of the communication defined by the structured object 230. In certain aspects, second LM 226 comprises an LLM.

In certain aspects, second LM 226 is prompted, based on a prompt 228, to perform structured object 230 generation. In certain aspects, prompt 228 includes (1) an indication of the markup language code 222 generated for static image 202, (2) an indication of a schema to use for generating structured object 230, and (3) instructions to generate structured object 230 based on the markup language code 222 and the one or more attributes 214, and in compliance with the indicated schema.

An example of prompt 228, which may be used to prompt second LM 226 implemented by structured object generator 224 is provided in FIGS. 5A-5C. As shown in FIGS. 5A-5C, the example prompt 500 includes instructions for generating a JSON object (e.g., an example structured object) from HTML code (e.g., example markup language code) generate for a static image representing a communication. For example, example prompt 500 includes instructions to "convert the email HTML [code] into [a] Nuni JSON [object]," as shown at 502 in FIG. 5A. Per example prompt 500, a "Nuni JSON [object]" refers to a proprietary representation of a communication, such as an email, before it has been rendered. As shown in FIGS. 5B and 5C, example prompt may include an indication of a schema based on providing a guide (initially referenced in example prompt 500 at 504 shown in FIG. 5B) for generating the Nuni JSON object. Note that example prompt 500 is a shortened version of a prompt that may be provided to second LM 226. For example, example prompt 500 may include additional elements beyond an image block element detailed in FIG. 5C as part of example prompt 500.

In certain aspects, structured object generator 224 generates structured object 230 according to a schema based on structured object generator 224 (1) identifying that a font type (e.g., an example attribute) associated with a visual element present in static image 202 is not included in a list of valid font types supported by the schema and (2) generating structured object 230 with an element corresponding to the visual element in static image 202, but with an alternative font type. The alternative font type may be font type that is included in the list of valid font types and is most similar to the font type associated with the visual element in static image 202. In certain aspects, the second LM 226 is used to determine the most similar font type to the font type associated with the visual element in static image 202. In certain aspects, font types listed in the list of valid font types may include font types that are compatible with a communication editing platform. In certain aspects, the list of valid font types is indicated via the schema. In certain aspects, this process helps to ensure that the structured object 230, generated by structured object generator 224, incorporates a font that closely matches the font type(s) used in static image 202, while also remaining compliant with the rendering requirements of the communication editing platform.

Renderer 232 may use the structured object 230 to generate communication 234 for display and interaction. Communication 234 generated by renderer 232 may represent a rendered output that is organized according to the layout and incorporates the elements defined in structured object 230. In certain aspects, the elements included in communication 234 exactly match the visual elements of the communication captured in static image 202. In certain other aspects, one or more elements included in communication 234 may be modified such that they do not exactly match corresponding visual elements in the communication captured in static image 202 (e.g., the font type has been changed, an image has been replaced with a box, the spacing between elements is increased, etc.).

In certain aspects, renderer 232 generates communication 234 as an editable communication within a communication editing platform (e.g., on a computing device) such that user(s) of the communication editing platform are able to modify one or more elements of communication 234 (e.g., a user may use the communication editing platform to adjust element(s) of communication 234). Example modifications, carried out via the communication editing platform, may include revising text, swapping images, changing colors, rearranging layout components, and/or performing other modifications to elements of communication 234. In an example practical use case, a user may modify the headline text of communication 234 to reflect a new promotion, replace a product image in communication 234 with a seasonal offering, and/or update a call-to-action button to direct recipients to a new landing page. In certain aspects, the communication editing platform allows for editing of the structured object 230 such that when communication 234 is rendered from the structured object 230, communication 234 includes one or more elements that have been modified.

For the example depicted in FIG. 2, communication 234, rendered by renderer 232, includes a modifiable email marketing template that resembles the email marketing campaign for Otherdays (e.g., (e.g., a corporation that sells dog food, as described above) that is captured in static image 202. Communication 234, or the modifiable email marking campaign, includes elements that correspond to identified visual elements in static image 202, or the email marketing campaign captured by static image 202. Specifically, one element in communication 234 may correspond to one visual element depicted in static image 202. For example, a first element, text "Black Friday Sale," in communication 234 corresponds to a first visual element, text "Black Friday Sale" in static image 202. As another example, a second visual element, a box with text "Happy Dog," in communication 234 corresponds to a second visual element, the image of the dog, in static image 202. Each element in a first set of elements included in communication 234 may exactly match its corresponding visual element in static image 202. For example, the black bar in communication 234 exactly matches the black bar in static image 202, with respect to color, shape, alignment, positioning, and size. Each element in a second set of elements included in communication 234 may not exactly match its corresponding visual element in static image 202. For example, the text "Black Friday Sale" in communication 234 includes the same language as text "Black Friday Sale" in static image 202; however, the size, boldness, and font type of text "Black Friday Sale" in communication 234 has been modified such that it does not have the same size, boldness, and font type as the text "Black Friday Sale" in static image 202.

In certain aspects, communication 234 generated by system 200 may be modified and sent to one or more recipients. For example, a user may modify communication 234 such that communication 234 includes elements promoting a different product for a different company than Otherdays and send this (modified) communication 234 to customers of the company.

Although FIG. 2 depicts the use of two LMs, e.g., first LM 218 and second LM 226, to perform both 1) attribute extraction, (2) markup language code generation, and (3) structured object generation, in certain other aspects, a single LM may be used to perform each of these tasks. For example, one LM may be trained for attribute extraction, markup language code generation, and structured object generation, and used accordingly in system 200.

In certain aspects, while it may be possible to generate a modifiable communication from a static image using a single LM, practical considerations may favor a two (or more) LM system for generating the modifiable communication. For example, the first LM used in the system may be a foundation LM, or a large-scale ML model pre-trained on vast and diverse datasets, including a wide range of publicly available text and code. Markup language code may be commonly found in public training data; thus, the foundation LM may be capable of generating accurate and well-structured markup language code from visual and/or textual input, such as with a high degree of proficiency. In contrast, the second LM used in the system may be specialized or fine-tuned to handle proprietary structured object formats, such as those used by specific communication editing platforms, which are far less common in public training data and often need significantly more context and schema-specific instructions for accurate generation. By separating the processes between the two LMs, the first LM (e.g., the foundation LM) may focus on translating the style and layout of the static image into a structured and widely understood markup language code, leveraging its robust training and inherent capabilities. The second, more specialized LM may then convert the generated markup language code into the proprietary structured object format, such as based on using targeted prompts and/or schema-specific context to ensure compliance and fidelity. This division of labor not only improves the accuracy and reliability of each transformation step (e.g., (1) static image to markup language code and (2) markup language code to a structured object) but also makes the training and fine-tuning of each model more manageable. For example, each LM may be configured for its specific task without the need to learn the entire end-to-end transformation. As a result, the system's flexibility, maintainability, and/or adaptability (e.g., to changes in either the markup language or the structured object) may be significantly enhanced.

Although FIG. 2 depicts the generation of a modifiable communication from a static image of a communication (e.g., generation of communication 234 from static image 202), in certain other aspects, a modifiable communication may be generated from markup language code for a static image. For example, system 200 may receive, as input, markup language code 222 instead of static image 202. Markup language code 222 may include code that represents the layout and content (e.g., visual element(s)) of the communication captured in static image 202. Thus, system 200 may proceed directly with structured object generator 224 generating (e.g., via use of second LM 226) structured object 230 from markup language code 222 and renderer 232 rendering communication 234 from structured object 230, without attribute extraction service(s) 204 and markup language code generator 216 also performing attributes 214 extraction and markup language code 222 generation, respectively.

Example JSON Object Generated for a Static Image of a Communication

Figure 6:
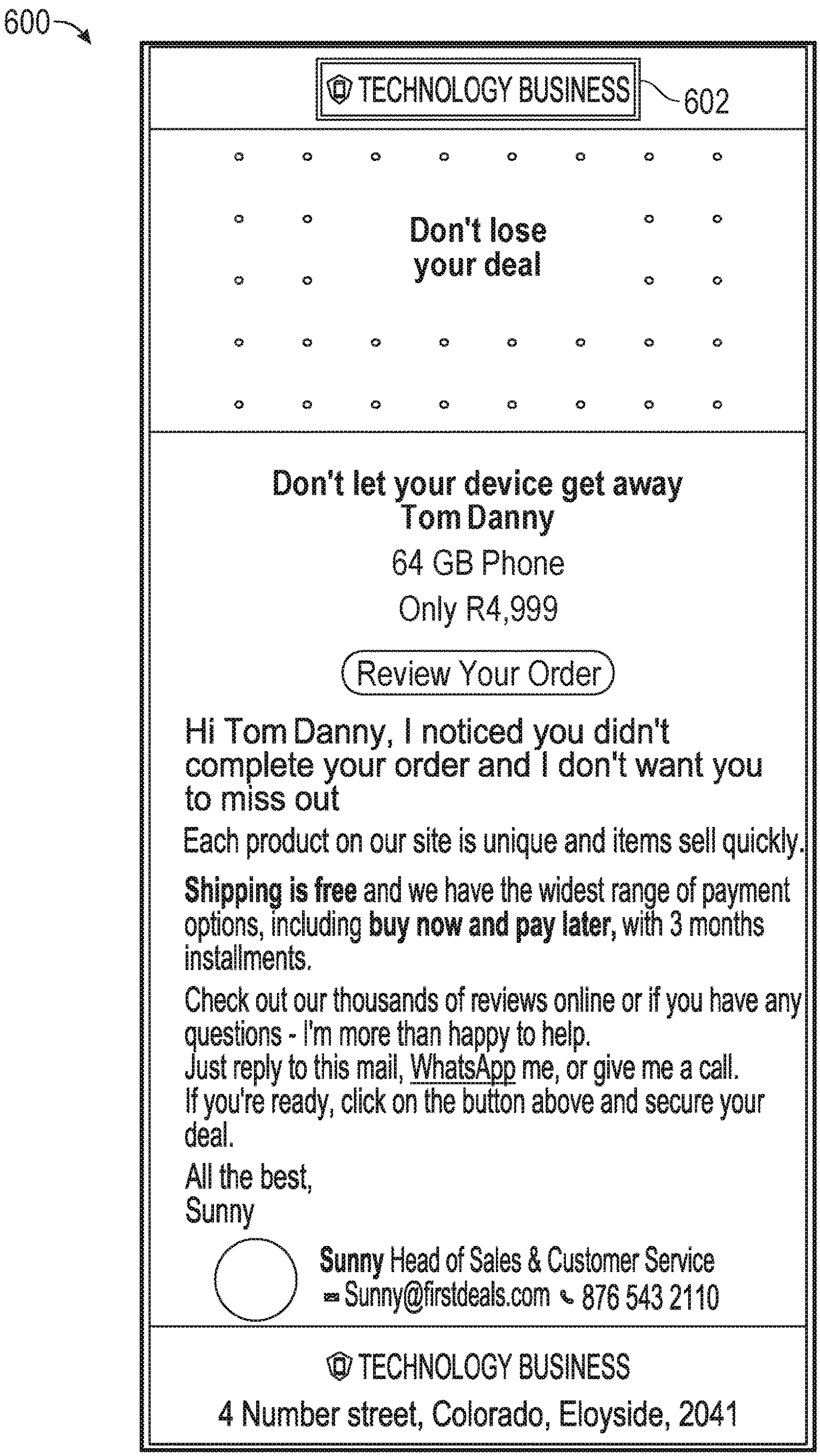
FIG. 6 depicts an example static image.

FIG. 6 depicts an example static image 600 of a communication, while FIGS. 7A and 7B depict an example JSON object created for static image 600 in FIG. 6. In certain aspects, system 200, described in detail above with respect to FIG. 2, is used to generate the example JSON object 700 for static image 600.

In this example, static image 600 comprises an image of an abandoned cart email sent to a customer of a Technology Business that has added a product of the Technology Business to their online shopping cart but has failed to check out. More specifically, the abandoned cart email is directed to a customer named "Smiles Davis" that has added a 64 gigabyte (GB) phone sold by the Technology Business to his online shopping cart but never completed his purchase. Example visual elements included in the abandoned cart email include the logo for the Technology Business included at the top of static image 600 (shown at 602), an image of the sender of the abandoned cart email, text reading "Don't lose your deal," and a blue background (e.g., shown with hatch marks in FIG. 6), among many others.

Example JSON object 700, depicted in FIGS. 7A and 7B, is a structured object that defines a modifiable version of the abandoned cart email captured in static image 600. For example, JSON object 700 specifies the organization and properties of individual elements that make up a modifiable version of the abandoned cart email. JSON object 700 may have been based on a JSON schema such that the resulting JSON object 700 is compatible with a communication editing platform that allows for the modification (e.g., editing) of JSON objects.

As shown at 702 in FIG. 7B, JSON object 700 defines a logo that is included in the modifiable version of the abandoned cart email. The logo is a "Technology Business logo" logo that is sourced from Google cloud storage, is center-aligned in the email, has a 150 width, etc. The "Technology Business" logo included in JSON object 700 corresponds to the "Technology Business" logo included in static image 600, at 602.

Example Methods for Modifiable Communication Generation

Figure 8:
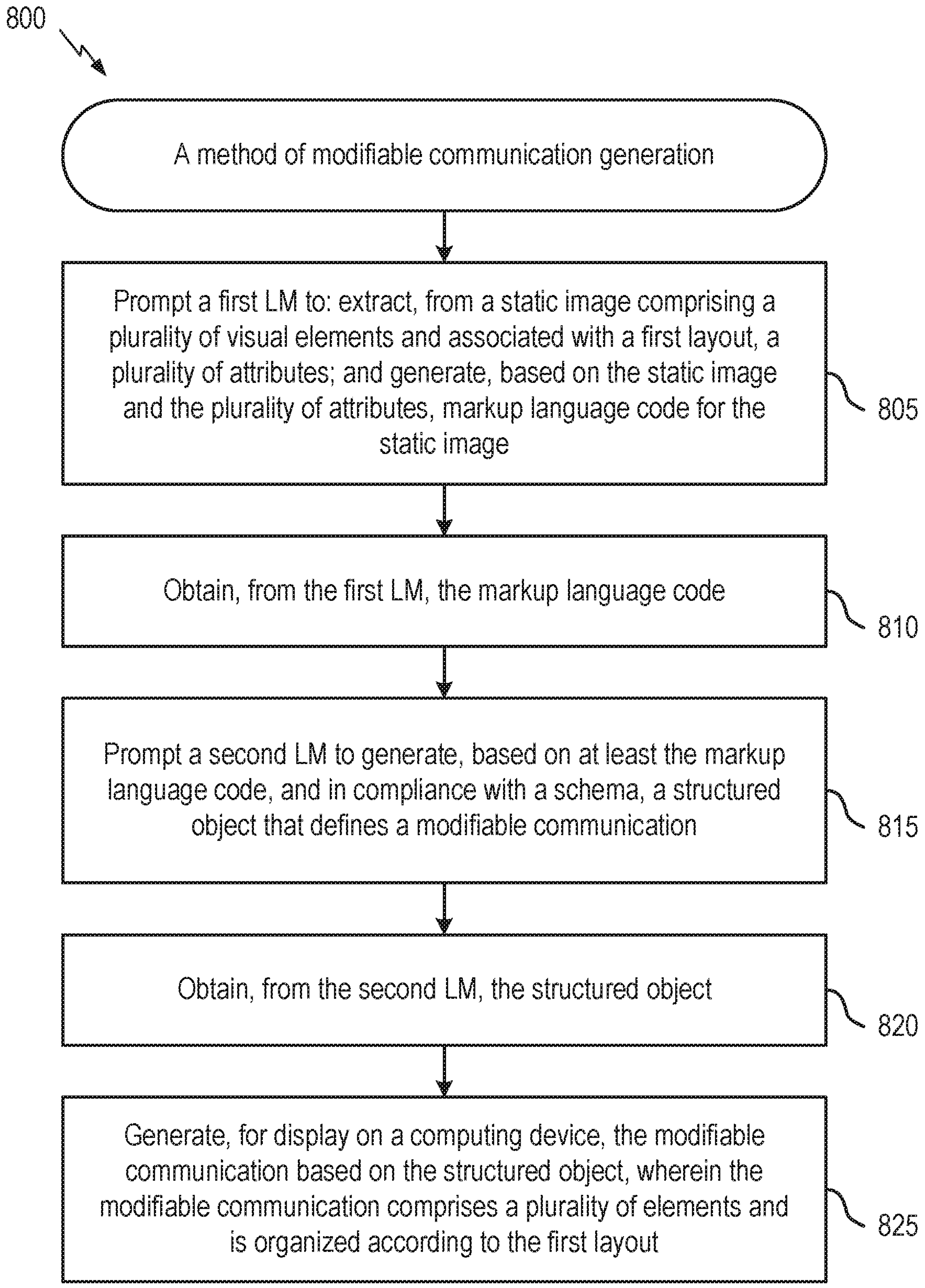
FIG. 8 depicts an example method for modifiable communication generation.

FIG. 8 depicts an example method 800 for modifiable communication generation. In one aspect, method 800 can be implemented by the system 100 of FIG. 1, the system 200 of FIG. 2, and/or processing system 1000 of FIG. 10.

Method 800 begins at block 805 with prompting a first LM to: extract, from a static image comprising a plurality of visual elements and associated with a first layout, a plurality of attributes; and generate, based on the static image and the plurality of attributes, markup language code for the static image.

Method 800 then proceeds to block 810 with obtaining, from the first LM, the markup language code.

Method 800 then proceeds to block 815 with prompting a second LM to generate, based on at least the markup language code, and in compliance with a schema, a structured object that defines a modifiable communication.

Method 800 then proceeds to block 820 with obtaining, from the second LM, the structured object.

Method 800 then proceeds to block 825 with generating, for display on a computing device, the modifiable communication based on the structured object, wherein the modifiable communication comprises a plurality of elements and is organized according to the first layout.

In some aspects, method 800 further includes, subsequent to generating the modifiable communication, adjusting at least one element of the plurality of elements of the modifiable communication.

In some aspects, prompting the second LM to generate the structured object, at block 815, includes prompting the second LM to generate the structured object based on the markup language code and one or more attributes of the plurality of attributes.

In some aspects, the plurality of attributes comprises at least one of: one or more bounding boxes associated with a first set of the plurality of visual elements included in the static image; one or more labels associated with a second set of the plurality of visual elements included in the static image; one or more descriptions associated with a third set of the plurality of visual elements included in the static image; or one or more paths associated with a fourth set of the plurality of visual elements included in the static image.

In some aspects, the plurality of attributes comprises one or more hex color codes associated with the static image.

In some aspects, the plurality of attributes comprises at least one of: text extracted from the static image; or one or more font types associated with the text extracted from the static image.

In some aspects, the plurality of attributes comprises at least one of: positioning information for a first set of the plurality of visual elements included in the static image; alignment information for a second set of the plurality of visual elements included in the static image; organization information associated with a third set of the plurality of visual elements included in the static image.

In some aspects, the first LM is prompted based on a prompt comprising: an indication of the static image; first instructions to extract the plurality of attributes; second instructions to generate the markup language code for the static image based on the plurality of attributes; and guidelines for generating the markup language code.

In some aspects, the second LM is prompted based on a prompt comprising: an indication of the markup language code for the static image; an indication of the schema; and instructions to generate the structured object based on at least the markup language code, and in compliance with the schema.

In some aspects, prompting the second LM to generate the structured object in compliance with the schema comprises prompting the second LM to: identify a first font type associated with the static image is not included in a list of valid font types associated with the structured object; and generate the structured object with an alternative font type instead of the first font type, wherein: the alternative font type is included in the list of valid font types, and a similarity measured between the first font type and the alternative font type is greater than a similarity measured between the first font type and any other font type in the list of valid font types.

In some aspects, method 800 further includes, prior to prompting the second LM to generate the structured object, rendering the markup language code as a synthetic image.

In some aspects, method 800 further includes, prior to prompting the second LM to generate the structured object, processing the static image with an embedding model to generate a first embedding.

In some aspects, method 800 further includes, prior to prompting the second LM to generate the structured object, processing the synthetic image with the embedding model to generate a second embedding.

In some aspects, method 800 further includes, prior to prompting the second LM to generate the structured object, modifying the markup language code based on a similarity measured between the first embedding and the second embedding being less than a threshold similarity.

In some aspects, method 800 further includes, prior to prompting the second LM to generate the structured object, rendering the markup language code as a synthetic image.

In some aspects, method 800 further includes, prior to prompting the second LM to generate the structured object, modifying the markup language code based on a pixel similarity measured between the static image and the synthetic image being less than a threshold similarity.

In some aspects, the markup language code comprises HTML code; the schema defines a JSON-based format for the structured object; and the structured object comprises a JSON object.

In some aspects, the static image comprises an image of a first email marketing campaign; and the modifiable communication comprises a modifiable second email marketing campaign.

In some aspects, the first LM comprises a first LLM; and the second LM comprises a second LLM.

By leveraging method 800, such as for the generation of a modifiable communication, significant technical advantages may be achieved. For example, method 800, when utilized, may offer a solution for efficiently and accurately transforming a static image of a communication design into a structured, editable format by orchestrating a sequence of attribute extraction, markup language code generation, and structured object creation. This approach enables the system to capture and preserve visual elements from the original static image, while ensuring compatibility with one or more downstream editing platforms. As a result, users may be able to rapidly convert non-editable visual designs into modifiable communications, reducing manual effort and minimizing the risk of errors associated with manual reconstruction. Accordingly, the performance and usability of digital communication workflows may be enhanced, supporting greater creative flexibility, faster communication deployment, and improved consistency across communication channels.

The use of multiple LMs in method 800 provides additional technical advantages. For example, LMs possess advanced natural language processing and, in the case of multimodal LMs, capabilities that allow them to interpret and generate multiple types of data modalities, such as textual and visual information. In certain aspects, this capability allows for the extraction of nuanced design elements and the understanding of complex relationships between content and layout within a static image. By leveraging these strengths, a high-fidelity modifiable communication that closely reflects the original intent and appearance of the communication captured in the static image may be generated.

Note that FIG. 8 is just one example of a method, and other methods including fewer, additional, or alternative operations are possible consistent with this disclosure.

Figure 9:
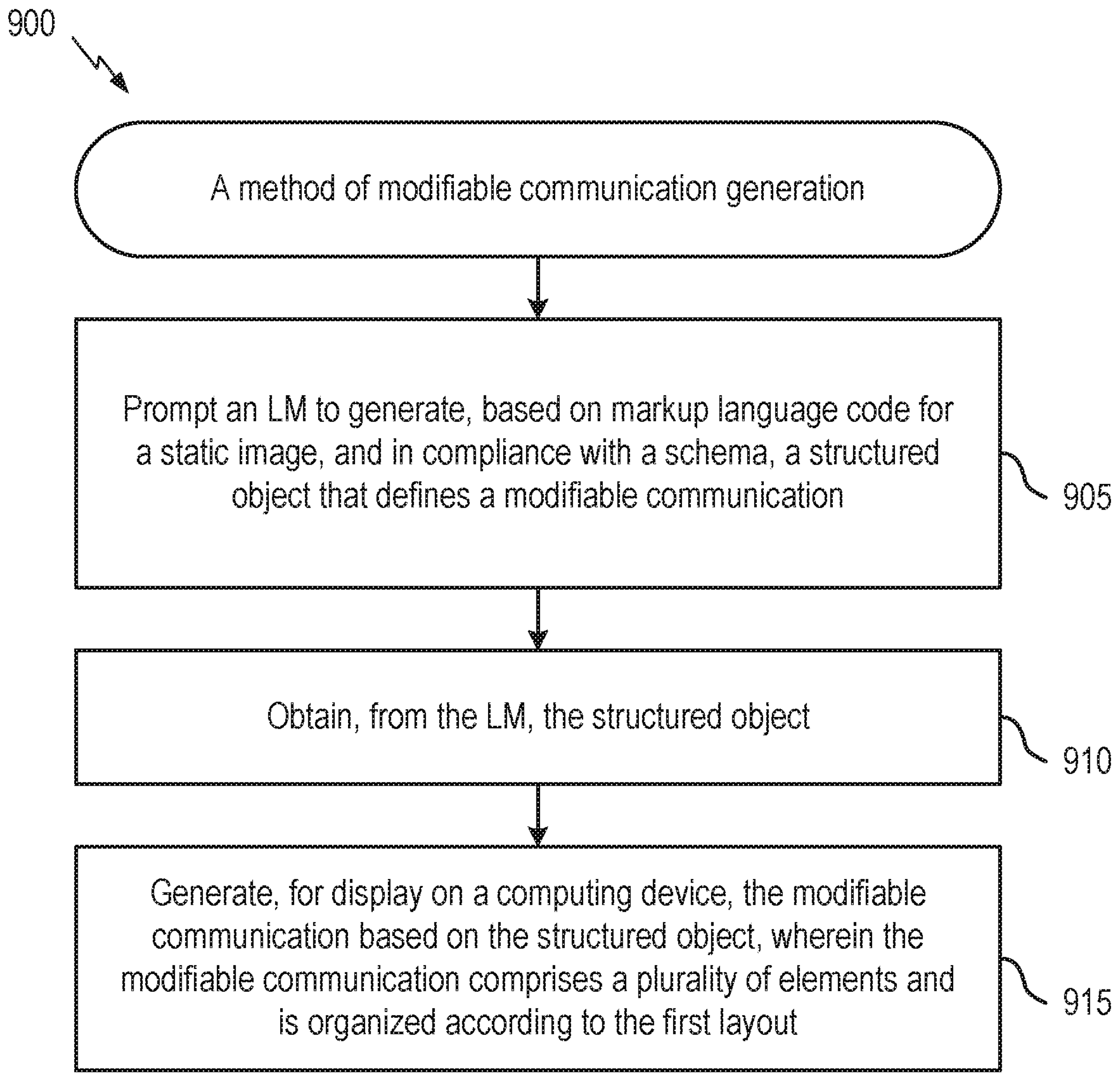
FIG. 9 depicts another example method for modifiable communication generation.

FIG. 9 depicts another example method 900 for modifiable communication generation. In one aspect, method 900 can be implemented by the system 100 of FIG. 1, the system 200 of FIG. 2, and/or processing system 1000 of FIG. 10.

Method 900 begins at block 905 with prompting an LM to generate, based on markup language code for a static image, and in compliance with a schema, a structured object that defines a modifiable communication. In some aspects, the static image comprises a plurality of visual elements and is associated with a first layout.

Method 900 then proceeds to block 910 with obtaining, from the LM, the structured object.

Method 900 then proceeds to block 915 with generating, for display on a computing device, the modifiable communication based on the structured object. In some aspects, the modifiable communication comprises a plurality of elements and is organized according to the first layout.

In some aspects, method 900 further includes, subsequent to generating the modifiable communication, adjusting at least one element of the plurality of elements of the modifiable communication.

In some aspects, the LM is prompted based on a prompt comprising: an indication of the markup language code for the static image; an indication of the schema; and instructions to generate the structured object based on at least the markup language code, and in compliance with the schema.

In some aspects, prompting the LM to generate the structured object in compliance with the schema, at block 905, comprises prompting the LM to: identify a first font type associated with the static image is not included in a list of valid font types associated with the structured object; and generate the structured object with an alternative font type instead of the first font type. The alternative font type may be included in the list of valid font types, and a similarity measured between the first font type and the alternative font type may be greater than a similarity measured between the first font type and any other font type in the list of valid font types.

In some aspects, the markup language code comprises HTML code; the schema defines a JSON-based format for the structured object; and the structured object comprises a JSON object.

In some aspects, the static image comprises an image of a first electronic email marketing campaign; and the modifiable communication comprises a modifiable second email marketing campaign.

In some aspects, the first LM comprises a first LLM; and the second LM comprises a second LLM.

By leveraging method 900, such as for the generation of a modifiable communication, significant technical advantages may be achieved. For example, method 900, when utilized, may offer a solution for efficiently and accurately transforming markup language for a static image of a communication design into a structured, editable format by orchestrating structured object creation, such as via use of a language model. This approach enables the system to capture and preserve visual elements from the original static image, while ensuring compatibility with one or more downstream editing platforms. As a result, users may be able to rapidly convert non-editable visual designs into modifiable communications, reducing manual effort and minimizing the risk of errors associated with manual reconstruction. Accordingly, the performance and usability of digital communication workflows may be enhanced, supporting greater creative flexibility, faster communication deployment, and improved consistency across communication channels.

Note that FIG. 9 is just one example of a method, and other methods including fewer, additional, or alternative operations are possible consistent with this disclosure.

Example Processing System for Modifiable Communication Generation

Figure 10:
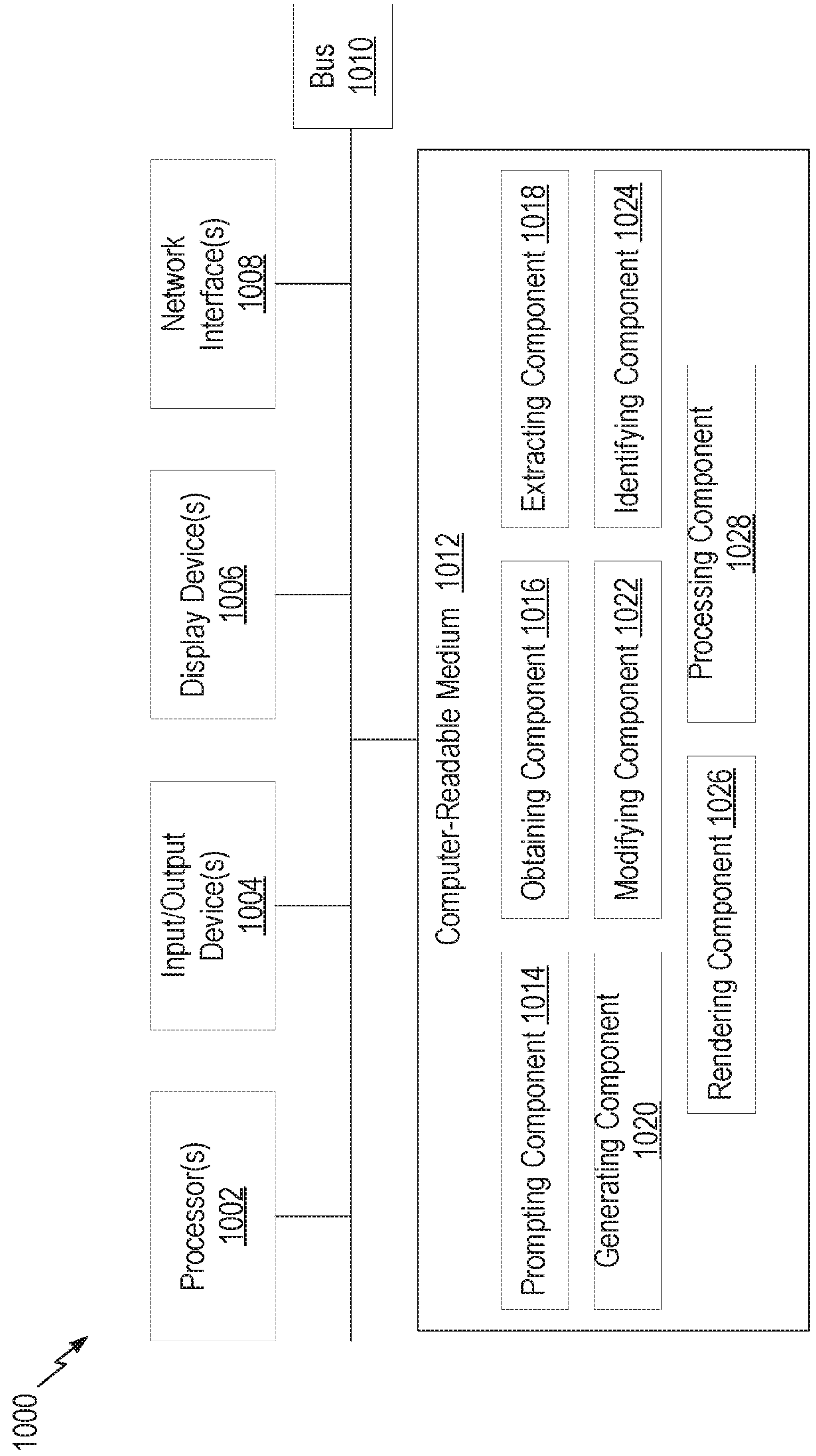
FIG. 10 depicts an example processing system with which aspects of the present disclosure can be performed.

FIG. 10 depicts an example processing system 1000 configured to perform various aspects described herein, including, for example, method 800 as described above with respect to FIG. 8 and/or method 900 as described above with respect to FIG. 9.

Processing system 1000 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1000 includes one or more processors 1002, one or more input/output devices 1004, one or more display devices 1006, one or more network interfaces 1008 through which processing system 1000 is connected to one or more networks (e.g., a local network, an intranet, the Internet, or any other group of processing systems communicatively connected to each other), and computer-readable medium 1012. In the depicted example, the aforementioned components are coupled by a bus 1010, which may generally be configured for data exchange amongst the components. Bus 1010 may be representative of multiple buses, while only one is depicted for simplicity.

Processor(s) 1002 are generally configured to retrieve and execute instructions stored in one or more memories, including local memories like computer-readable medium 1012, as well as remote memories and data stores. Similarly, processor(s) 1002 are configured to store application data residing in local memories like the computer-readable medium 1012, as well as remote memories and data stores. More generally, bus 1010 is configured to transmit programming instructions and application data among the processor(s) 1002, display device(s) 1006, network interface(s) 1008, and/or computer-readable medium 1012. In certain embodiments, processor(s) 1002 are representative of a one or more central processing units (CPUs), graphics processing unit (GPUs), tensor processing unit (TPUs), accelerators, and other processing devices.

Input/output device(s) 1004 may include any device, mechanism, system, interactive display, and/or various other hardware and software components for communicating information between processing system 1000 and a user of processing system 1000. For example, input/output device(s) 1004 may include input hardware, such as a keyboard, touch screen, button, microphone, speaker, and/or other device for receiving inputs from the user and sending outputs to the user.

Display device(s) 1006 may generally include any sort of device configured to display data, information, graphics, user interface elements, and the like to a user. For example, display device(s) 1006 may include internal and external displays such as an internal display of a tablet computer or an external display for a server computer or a projector. Display device(s) 1006 may further include displays for devices, such as augmented, virtual, and/or extended reality devices. In various embodiments, display device(s) 1006 may be configured to display a graphical user interface.

Network interface(s) 1008 provide processing system 1000 with access to external networks and thereby to external processing systems. Network interface(s) 1008 can generally be any hardware and/or software capable of transmitting and/or receiving data via a wired or wireless network connection. Accordingly, network interface(s) 1008 can include a communication transceiver for sending and/or receiving any wired and/or wireless communication.

Computer-readable medium 1012 may be a volatile memory, such as a random access memory (RAM), or a nonvolatile memory, such as nonvolatile random access memory (NVRAM), or the like. In this example, computer-readable medium 1012 includes prompting component 1014, obtaining component 1016, extracting component 1018, generating component 1020, modifying component 1022, identifying component 1024, rendering component 1026, and processing component 1028. Processing of the components 1014-1028 may enable and cause the processing system 1000 to perform the method 800 described with respect to FIG. 8, method 900 as described above with respect to FIG. 9, or any aspect related to method 800 and/or method 900.

In certain embodiments, prompting component 1014 is configured to prompt a first LM to: extract, from a static image comprising a plurality of visual elements and associated with a first layout, a plurality of attributes; and generate, based on the static image and the plurality of attributes, markup language code for the static image, as described above with reference to block 805 of FIG. 8. In certain embodiments, obtaining component 1016 is configured to obtain, from the first LM, the markup language code, as described above with reference to block 810 of FIG. 8. In certain embodiments, prompting component 1014 is configured to prompt a second LM to generate, based on the markup language code and one or more attributes of the plurality of attributes, and in compliance with a schema, a structured object that defines a modifiable communication, as described above with reference to block 815 of FIG. 8 and similarly with reference to block 905 of FIG. 9. In certain embodiments, obtaining component 1016 is configured to obtain, from the second LM, the structured object, as described above with reference to block 820 of FIG. 8 and similarly with reference to block 910 of FIG. 9. In certain embodiments, generating component 1020 is configured to generate, for display on a computing device, the modifiable communication based on the structured object, wherein the modifiable communication comprises a plurality of elements and is organized according to the first layout, as described above with reference to block 825 of FIG. 8 and similarly with reference to block 915 of FIG. 9.

Note that FIG. 10 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of modifiable communication generation, comprising: prompting a first LM to: extract, from a static image comprising a plurality of visual elements and associated with a first layout, a plurality of attributes; and generate, based on the static image and the plurality of attributes, markup language code for the static image; obtaining, from the first LM, the markup language code; prompting a second LM to generate, based on at least the markup language code, and in compliance with a schema, a structured object that defines a modifiable communication; obtaining, from the second LM, the structured object; and generating, for display on a computing device, the modifiable communication based on the structured object, wherein the modifiable communication comprises a plurality of elements and is organized according to the first layout.

Clause 2: The method of Clause 1, further comprising: subsequent to generating the modifiable communication, adjusting at least one element of the plurality of elements of the modifiable communication.

Clause 3: The method of any one of Clauses 1-2, wherein prompting the second LM to generate the structured object comprises prompting the second LM to generate the structured object based on the markup language code and one or more attributes of the plurality of attributes.

Clause 4: The method of any one of Clauses 1-3, wherein the plurality of attributes comprises at least one of: one or more bounding boxes associated with a first set of the plurality of visual elements included in the static image; one or more labels associated with a second set of the plurality of visual elements included in the static image; one or more descriptions associated with a third set of the plurality of visual elements included in the static image; or one or more paths associated with a fourth set of the plurality of visual elements included in the static image.

Clause 5: The method of any one of Clauses 1-4, wherein the plurality of attributes comprises one or more hex color codes associated with the static image.

Clause 6: The method of any one of Clauses 1-5, wherein the plurality of attributes comprises at least one of: text extracted from the static image; or one or more font types associated with the text extracted from the static image.

Clause 7: The method of any one of Clauses 1-6, wherein the plurality of attributes comprises at least one of: positioning information for a first set of the plurality of visual elements included in the static image; alignment information for a second set of the plurality of visual elements included in the static image; organization information associated with a third set of the plurality of visual elements included in the static image.

Clause 8: The method of any one of Clauses 1-7, wherein the first LM is prompted based on a prompt comprising: an indication of the static image; first instructions to extract the plurality of attributes; second instructions to generate the markup language code for the static image based on the plurality of attributes; and guidelines for generating the markup language code.

Clause 9: The method of any one of Clauses 1-8, wherein the second LM is prompted based on a prompt comprising: an indication of the markup language code for the static image; an indication of the schema; and instructions to generate the structured object based on at least the markup language code, and in compliance with the schema.

Clause 10: The method of any one of Clauses 1-9, wherein prompting the second LM to generate the structured object in compliance with the schema comprises prompting the second LM to: identify a first font type associated with the static image is not included in a list of valid font types associated with the structured object; and generate the structured object with an alternative font type instead of the first font type, wherein: the alternative font type is included in the list of valid font types, and a similarity measured between the first font type and the alternative font type is greater than a similarity measured between the first font type and any other font type in the list of valid font types.

Clause 11: The method of any one of Clauses 1-10, further comprising, prior to prompting the second LM to generate the structured object: rendering the markup language code as a synthetic image; processing the static image with an embedding model to generate a first embedding; processing the synthetic image with the embedding model to generate a second embedding; and modifying the markup language code based on a similarity measured between the first embedding and the second embedding being less than a threshold similarity.

Clause 12: The method of any one of Clauses 1-11, further comprising, prior to prompting the second LM to generate the structured object: rendering the markup language code as a synthetic image; and modifying the markup language code based on a pixel similarity measured between the static image and the synthetic image being less than a threshold similarity.

Clause 13: The method of any one of Clauses 1-12, wherein: the markup language code comprises HTML code; the schema defines a JSON-based format for the structured object; and the structured object comprises a JSON object.

Clause 14: The method of any one of Clauses 1-13, wherein: the static image comprises an image of a first email marketing campaign; and the modifiable communication comprises a modifiable second email marketing campaign.

Clause 15: The method of any one of Clauses 1-14, wherein: the first LM comprises a first LLM; and the second LM comprises a second LLM.

Clause 16: A method of modifiable communication generation, comprising: prompting an LM to generate, based on markup language code for a static image, and in compliance with a schema, a structured object that defines a modifiable communication, wherein the static image comprises a plurality of visual elements and is associated with a first layout; obtaining, from the LM, the structured object; and generating, for display on a computing device, the modifiable communication based on the structured object, wherein the modifiable communication comprises a plurality of elements and is organized according to the first layout.

Clause 17: The method of Clause 16, further comprising, subsequent to generating the modifiable communication, adjusting at least one element of the plurality of elements of the modifiable communication.

Clause 18: The method of any one of Clauses 16-17, wherein the LM is prompted based on a prompt comprising: an indication of the markup language code for the static image; an indication of the schema; and instructions to generate the structured object based on at least the markup language code, and in compliance with the schema.

Clause 19: The method of any one of Clauses 16-18, wherein prompting the LM to generate the structured object in compliance with the schema comprises prompting the LM to: identify a first font type associated with the static image is not included in a list of valid font types associated with the structured object; and generate the structured object with an alternative font type instead of the first font type, wherein: the alternative font type is included in the list of valid font types, and a similarity measured between the first font type and the alternative font type is greater than a similarity measured between the first font type and any other font type in the list of valid font types.

Clause 20: The method of any one of Clauses 16-19, wherein: the markup language code comprises HTML code; the schema defines a JSON-based format for the structured object; and the structured object comprises a JSON object.

Clause 21: The method of any one of Clauses 16-20, wherein: the static image comprises an image of a first electronic email marketing campaign; and the modifiable communication comprises a modifiable second email marketing campaign.

Clause 22: The method of any one of Clauses 16-21, wherein: the first LM comprises a first LLM; and the second LM comprises a second LLM.

Clause 23: A processing system, comprising: memory comprising computer-executable instructions; and one or more processors configured to execute the computer-executable instructions and cause the processing system to perform a method in accordance with any one of Clauses 1-22.

Clause 24: A processing system, comprising means for performing a method in accordance with any one of Clauses 1-22.

Clause 25: A non-transitory computer-readable medium storing program code for causing a processing system to perform the steps of any one of Clauses 1-22.

Clause 26: A computer program product embodied on a computer-readable storage medium comprising code for performing a method in accordance with any one of Clauses 1-22.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of modifiable communication generation, comprising:

prompting a first language model (LM) to:

extract, from a static image comprising a plurality of visual elements and associated with a first layout, a plurality of attributes; and generate, based on the static image and the plurality of attributes, markup language code for the static image;

obtaining, from the first LM, the markup language code;

prompting a second LM to generate, based on at least the markup language code, and in compliance with a schema, a structured object that defines a modifiable communication;

obtaining, from the second LM, the structured object;

generating, for display on a computing device, the modifiable communication based on the structured object, wherein the modifiable communication comprises a plurality of elements and is organized according to the first layout; and subsequent to generating the modifiable communication for display on the computing device, adjusting at least one element of the plurality of elements of the modifiable communication.

2. The method of claim 1, wherein prompting the second LM to generate the structured object comprises prompting the second LM to generate the structured object based on the markup language code and one or more attributes of the plurality of attributes.

3. The method of claim 1, wherein the plurality of attributes comprises at least one of:

one or more bounding boxes associated with a first set of the plurality of visual elements included in the static image;

one or more labels associated with a second set of the plurality of visual elements included in the static image;

one or more descriptions associated with a third set of the plurality of visual elements included in the static image; or one or more paths associated with a fourth set of the plurality of visual elements included in the static image.

4. The method of claim 1, wherein the plurality of attributes comprises one or more hexadecimal (hex) color codes associated with the static image.

5. The method of claim 1, wherein the plurality of attributes comprises at least one of:

text extracted from the static image; or one or more font types associated with the text extracted from the static image.

6. The method of claim 1, wherein the plurality of attributes comprises at least one of:

positioning information for a first set of the plurality of visual elements included in the static image;

alignment information for a second set of the plurality of visual elements included in the static image; or organization information associated with a third set of the plurality of visual elements included in the static image.

7. The method of claim 1, wherein the first LM is prompted based on a prompt comprising:

an indication of the static image;

first instructions to extract the plurality of attributes;

second instructions to generate the markup language code for the static image based on the plurality of attributes; and guidelines for generating the markup language code.

8. The method of claim 1, wherein the second LM is prompted based on a prompt comprising:

an indication of the markup language code for the static image;

an indication of the schema; and instructions to generate the structured object based on at least the markup language code, and in compliance with the schema.

9. The method of claim 1, wherein prompting the second LM to generate the structured object in compliance with the schema comprises prompting the second LM to:

identify a first font type associated with the static image is not included in a list of valid font types associated with the structured object; and generate the structured object with an alternative font type instead of the first font type, wherein:

the alternative font type is included in the list of valid font types, and a similarity measured between the first font type and the alternative font type is greater than a similarity measured between the first font type and any other font type in the list of valid font types.

10. The method of claim 1, further comprising, prior to prompting the second LM to generate the structured object:

rendering the markup language code as a synthetic image;

processing the static image with an embedding model to generate a first embedding;

processing the synthetic image with the embedding model to generate a second embedding; and modifying the markup language code based on a similarity measured between the first embedding and the second embedding being less than a threshold similarity.

11. The method of claim 1, further comprising, prior to prompting the second LM to generate the structured object:

rendering the markup language code as a synthetic image; and modifying the markup language code based on a pixel similarity measured between the static image and the synthetic image being less than a threshold similarity.

12. The method of claim 1, wherein:

the markup language code comprises hypertext markup language (HTML) code;

the schema defines a JavaScript Object Notation (JSON)-based format for the structured object; and the structured object comprises a JSON object.

13. The method of claim 1, wherein:

the static image comprises an image of a first electronic email marketing campaign; and the modifiable communication comprises a modifiable second email marketing campaign.

14. A method of modifiable communication generation, comprising:

prompting a language model (LM) to generate, based on markup language code for a static image, and in compliance with a schema, a structured object that defines a modifiable communication, wherein the static image comprises a plurality of visual elements and is associated with a first layout;

obtaining, from the LM, the structured object;

generating, for display on a computing device, the modifiable communication based on the structured object, wherein the modifiable communication comprises a plurality of elements and is organized according to the first layout; and subsequent to generating the modifiable communication for display on the computing device, adjusting at least one element of the plurality of elements of the modifiable communication.

15. The method of claim 14, wherein the LM is prompted based on a prompt comprising:

an indication of the markup language code for the static image;

an indication of the schema; and instructions to generate the structured object based on at least the markup language code, and in compliance with the schema.

16. The method of claim 14, wherein prompting the LM to generate the structured object in compliance with the schema comprises prompting the LM to:

identify a first font type associated with the static image is not included in a list of valid font types associated with the structured object; and generate the structured object with an alternative font type instead of the first font type, wherein:

the alternative font type is included in the list of valid font types, and a similarity measured between the first font type and the alternative font type is greater than a similarity measured between the first font type and any other font type in the list of valid font types.

17. The method of claim 14, wherein:

the markup language code comprises hypertext markup language (HTML) code;

the schema defines a JavaScript Object Notation (JSON)-based format for the structured object; and the structured object comprises a JSON object.

18. A processing system, comprising: memory comprising computer-executable instructions; and one or more processors configured to execute the computer-executable instructions and cause the processing system to:

prompt a first LM to:

extract, from a static image comprising a plurality of visual elements and associated with a first layout, a plurality of attributes; and generate, based on the static image and the plurality of attributes, markup language code for the static image;

obtain, from the first LM, the markup language code;

prompt a second LM to generate, based on at least the markup language code, and in compliance with a schema, a structured object that defines a modifiable communication;

obtain, from the second LM, the structured object;

generate, for display on a computing device, the modifiable communication based on the structured object, wherein the modifiable communication comprises a plurality of elements and is organized according to the first layout; and subsequent to generating the modifiable communication for display on the computing device, adjusting at least one element of the plurality of elements of the modifiable communication.

19. The processing system of claim 18, wherein to cause the processing system to prompt the second LM to generate the structured object, the one or more processors are configured to cause the processing system to prompt the second LM to generate the structured object based on the markup language code and one or more attributes of the plurality of attributes.

20. The processing system of claim 18, wherein the plurality of attributes comprises at least one of:

one or more bounding boxes associated with a first set of the plurality of visual elements included in the static image;

one or more labels associated with a second set of the plurality of visual elements included in the static image;
one or more descriptions associated with a third set of the plurality of visual elements included in the static image; or
one or more paths associated with a fourth set of the plurality of visual elements included in the static image.

* * * * *